J. A. COX.
TIRE CHAIN LOCK.
APPLICATION FILED OCT. 9, 1916.
1,280,408.
Patented Oct. 1, 1918.
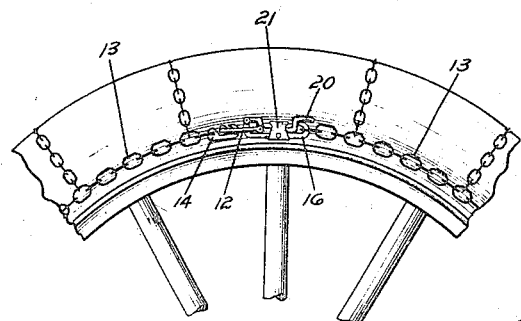
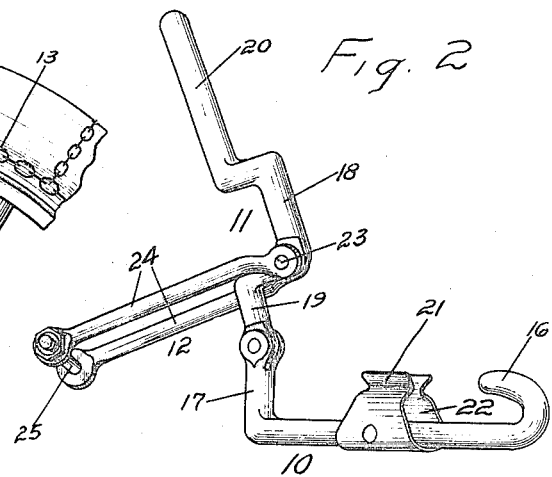
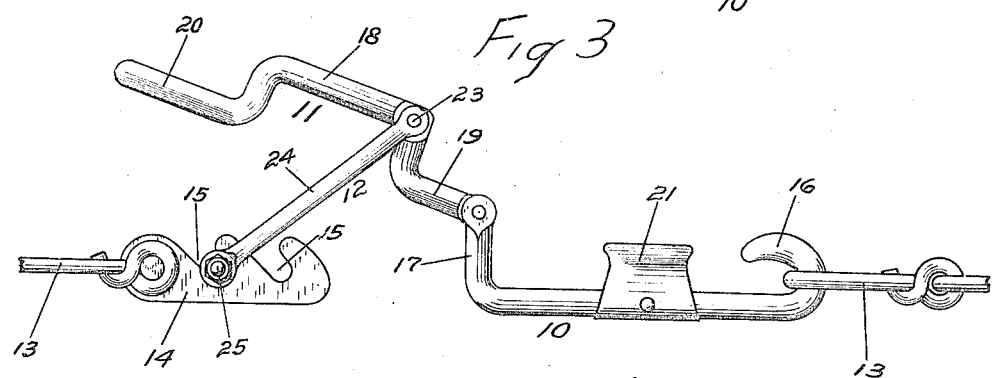
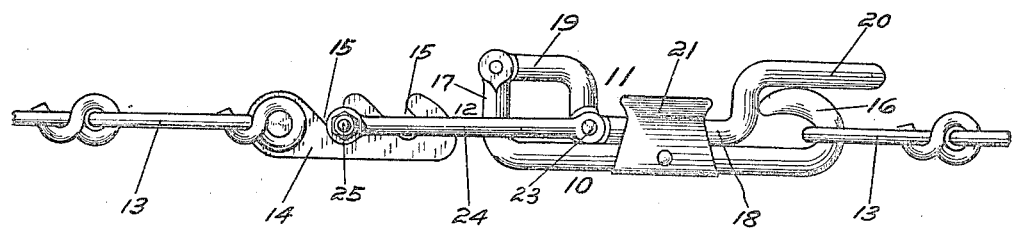
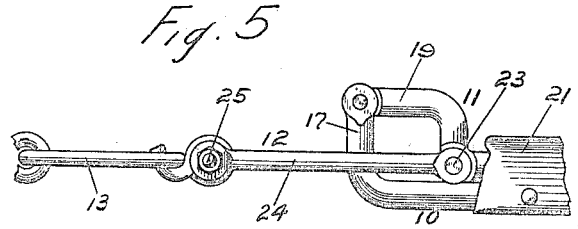
INVENTOR
John Adolphus Cox
BY
Wooster & Bowercock
ATTORNEYS

UNITED STATES PATENT OFFICE.

JOHN ADOLPHUS COX, OF BRIDGEPORT, CONNECTICUT.

TIRE-CHAIN LOCK.

1,280,408.  Specification of Letters Patent.  Patented Oct. 1, 1918.

Application filed October 9, 1916. Serial No. 124,652.

*To all whom it may concern:*

Be it known that I, JOHN ADOLPHUS COX, a citizen of the United States, residing at Bridgeport, county of Fairfield, State of Connecticut, have invented an Improvement in Tire-Chain Locks, of which the following is a specification.

This invention relates to tire chains, so called, and has for its object to provide a simple and inexpensive locking and tension adjusting device adapted for use in connection with any non-skid device having side chains, which shall be easy to operate in attaching, removing or adjusting a tire chain, and which shall be self-locking, that is, self-retaining in the locking position, one of the devices being preferably used with each side chain.

With these and other objects in view, I have devised the novel tire chain lock which I will now describe, referring to the accompanying drawing forming a part of this specification, and using reference characters to indicate the several parts:

Figure 1 is a partial side elevation of an automobile wheel illustrating the use of one form of my novel chain lock in securing a tire chain thereon;

Fig. 2 a perspective view on an enlarged scale showing a slightly modified form of my novel chain lock detached and in the open position;

Fig. 3 a side elevation showing the device connected to the ends of a side chain having a hook member, but remaining in the open or unlocked position;

Fig. 4 a similar view showing the parts in the locked position, and

Fig. 5 is a similar view showing a form in which the hook member is dispensed with.

The essential features of my novel chain lock are a body indicated as a whole by 10, a clamping lever indicated as a whole by 11, and a connecting member indicated as a whole by 12. These members coöperate with the side chains 13 (one only being shown) of a tire chain, so called. One end of the side chain may or may not be provided with a hook member 14 having a plurality of engaging notches, indicated by 15. The body is provided at one end with a hook 16 which is adapted to engage the end link of the side chain (that is, the link at the opposite end from the hook member), and at the other end with an angle arm 17. The clamping lever comprises a broadly U-shaped portion, indicated by 18, arm 19 extending outward from one end of the U-shaped portion and pivoted to the angle arm of the body, and a hand piece 20 extending outward from the other end of the U-shaped portion in approximate alinement with arm 19. The connecting member is pivoted to the clamping lever at the corner angle of the U-shaped portion nearest to the angle arm of the body, as at 23, and is adapted to engage either of the notches 15 in the hook member. The connecting member may be made in a single piece as in Fig. 1, that is with the ends of the side pieces opposite to the pivotal end, integrally connected. I preferably, however, use a connecting member consisting of independent side pieces 24, and connect the ends opposite to the pivotal ends by means of a removable bolt 25. In use, the hook on the body is engaged with a link of the side chain at or near the end and the connecting member is engaged with one of the notches in the hook member, as in Fig. 3. The clamping lever is then swung from the position shown in Fig. 3 to that in Fig. 4, thereby stretching the side chains tightly, and locking the device in place. The body and the clamping lever are especially designed to make the device self-locking, that is, self-retaining in the locked position. It will be noted that in the locked position the U-shaped portion of the clamping lever lies between the hook and the angle arm of the body, that the pull of the connecting member is upon the base of the U-shaped portion, and that the pivotal point of the connecting member to the clamping lever is at quite an appreciable distance below the pivotal point of the clamping lever to the angle arm of the body, thus making the device self-retaining in the locked position. When the parts are in this position it is practically impossible to unlock the device except by manual operation of the clamping lever. In order, however, to make the device still more nearly fool-proof, I may provide a locking spring 21 secured to the body and provided with arms which curve upward and inward toward each other and then outward again, leaving a socket 22 adapted to receive the base of the U-shaped portion of the clamping lever. The outer ends of the arms of the spring are so shaped that when the base of the U-shaped portion is pressed down upon them, they will be forced apart to let the lever pass, and will then spring together again over the lever to additionally secure it in the locking position. The device is easy to operate owing to the fact that the clamping lever is a lever of the second order and the weight is relatively near to the fulcrum.

In the form illustrated in Fig. 5 the hook member is dispensed with and the bolt 25 of the connecting member is passed through the end link at the other end of the side chain. This form is useful when the side chains are not provided with hook members or when for any reason, the operator prefers to dispense with the hook members. Under ordinary conditions the attachment of the connecting member to the side chains need not be disturbed in attaching and removing the device. If the side chains are too loose on the tire, hook 16 on the body may be engaged with the second or third link instead of with the end link of the side chain. The operation in use is otherwise the same as before.

Having thus described my invention, I claim:—

1. A device of the character described comprising a body having at one end a hook adapted to engage one end of a side chain, and at the other end an angle arm, a clamping lever comprising a broadly U-shaped portion and an arm pivoted to the angle arm of the body, and a hand piece, and a connecting member adapted to engage the other end of a side chain and pivoted to the clamping lever at the corner angle of the U-shaped portion nearest to the angle arm of the body, the U-shaped portion, when in the locking position, lying between the hook and the angle arm of the body, and the pivotal point of the connecting member to the clamping lever lying past the pivotal point of the clamping lever to the body, whereby the parts are made self-retaining in the locking position.

2. A device of the character described comprising a body having at one end a hook and at the other end an angle arm, a U-shaped clamping lever having an arm pivoted to the angle arm of the body, a connecting member pivoted to the clamping lever at the corner angle nearest to the angle arm of the body, substantially as described, for the purpose specified, and a locking spring upon the body for additionally retaining the clamping lever in the locking position.

In testimony whereof I affix my signature.

JOHN ADOLPHUS COX.